United States Patent

[11] 3,548,965

| [72] | Inventor | John J. Pierro |
| | | Inglewood, Calif. |
| [21] | Appl. No. | 741,676 |
| [22] | Filed | July 1, 1968 |
| [45] | Patented | Dec. 22, 1970 |
| [73] | Assignee | North American Rockwell Corporation |

[54] VEHICLE WHEEL DRIVE WITH OUTSIDE CLAW TOOTH ROTOR SYNCHRONOUS MOTOR
3 Claims, 6 Drawing Figs.

[52] U.S. Cl. .................................................. 180/65,
310/67, 310/74, 310/162, 310/263; 318/171, 318/175
[51] Int. Cl. .................................................. B60k 7/00,
H02k 19/06, H02p 5/34
[50] Field of Search .......................................... 180/55, 60,
63, 65; 310/67, 263

[56] References Cited
UNITED STATES PATENTS

| 2,039,513 | 5/1936 | Baker | 180/65 |
| 2,899,005 | 8/1959 | Speicher | 180/60 |
| 3,302,739 | 2/1967 | Beck et al. | 180/24 |
| 3,477,536 | 11/1969 | Carini | 180/65 |
| 3,456,136 | 7/1969 | Pierro | 310/12 |

*Primary Examiner*—W. E. Ray
*Attorneys*—William R. Lane, Charles F. Dischler and Harold H. Card, Jr.

ABSTRACT: A synchronous motor has a circular rotating pair of cylindrical pole pieces of clawtooth form connected with propulsion means such as a wheel, and is driven by interaction of magnetic fields produced by segmented modular stator and field windings peripherally situated at spaced locations about the pole pieces energized by polyphase alternating current at a frequency determined by the speed of rotation of the pole pieces relative to the stationary stator and field coils. An additional DC signal is applied to the field windings. For higher power requirements, the number of segmented stator and field coil units can be increased.

PATENTED DEC 22 1970

INVENTOR.
JOHN J. PIERRO

BY
ATTORNEY

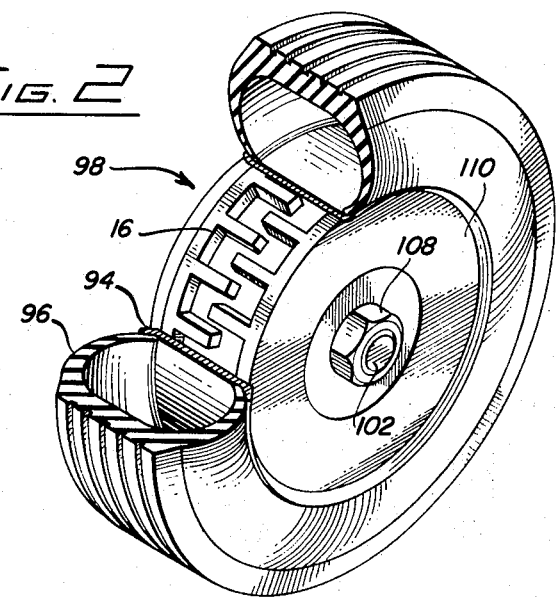
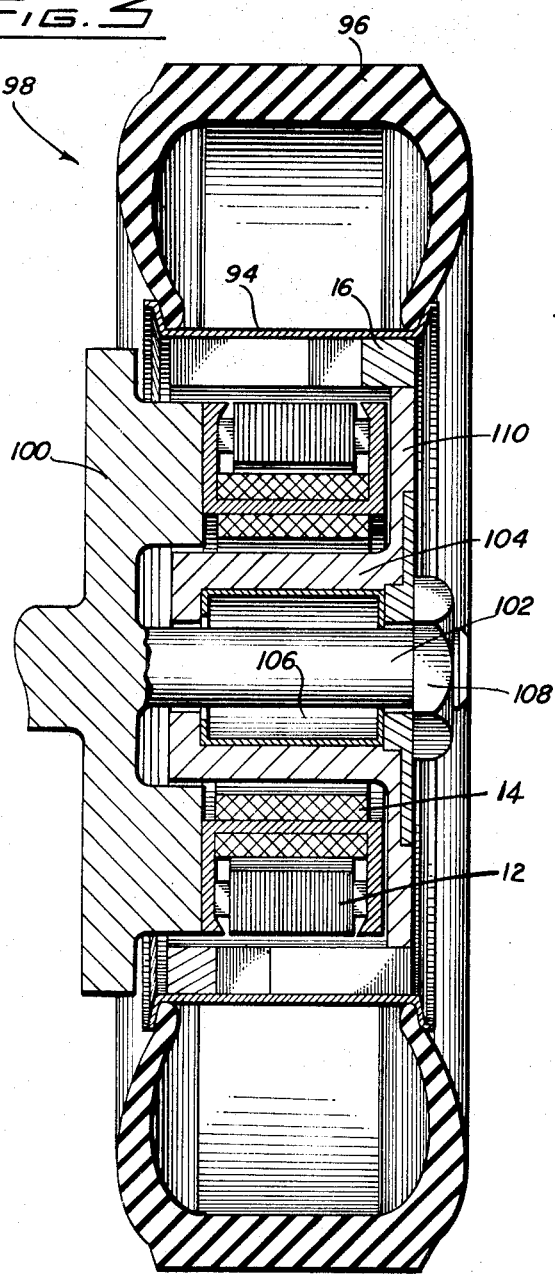
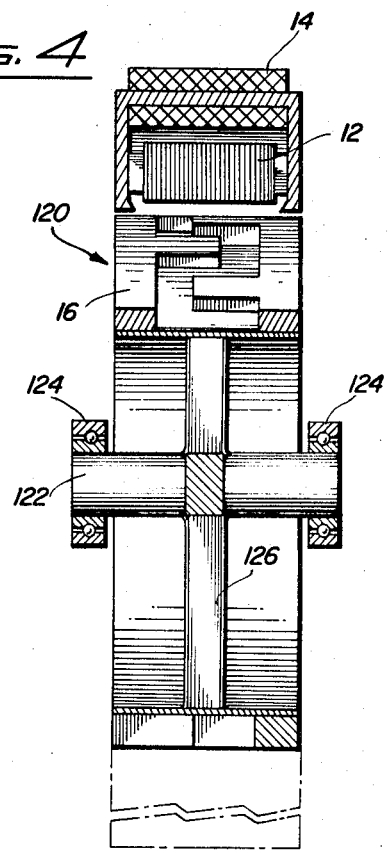
INVENTOR.
JOHN J. PIERRO
ATTORNEY 3,548,965

VEHICLE WHEEL DRIVE WITH OUTSIDE CLAW TOOTH ROTOR SYNCHRONOUS MOTOR

SUMMARY OF INVENTION

This invention contemplates different forms of use as a propulsion or drive motor, and broadly comprises rotational synchronous motor provided with stationary stator and field coils operatively related with a cylindrical rotor comprising spaced salient magnetic pole pieces. Separate exitation flux paths through successive pole pieces of the rotor are provided between the field coil and the stator coil. Propulsive force results from the two stated flux fields attempting to become aligned, causing rotation of the rotor. A flywheel, propeller or vehicle wheel may be affixed to the rotor and driven thereby without the use of gears.

DESCRIPTION OF DRAWINGS

FIG. 2 shows a general perspective view, partly cut away, showing a motor of the type shown in FIG. 1 incorporated in a vehicle wheel, FIG. 3 shows the wheel of FIG. 4 in cross section, FIG. 4 shows a motor of the type shown in FIGS. 1, 2, and 3 but operatively related to a flywheel.

DETAILED DESCRIPTION

Figure 1:
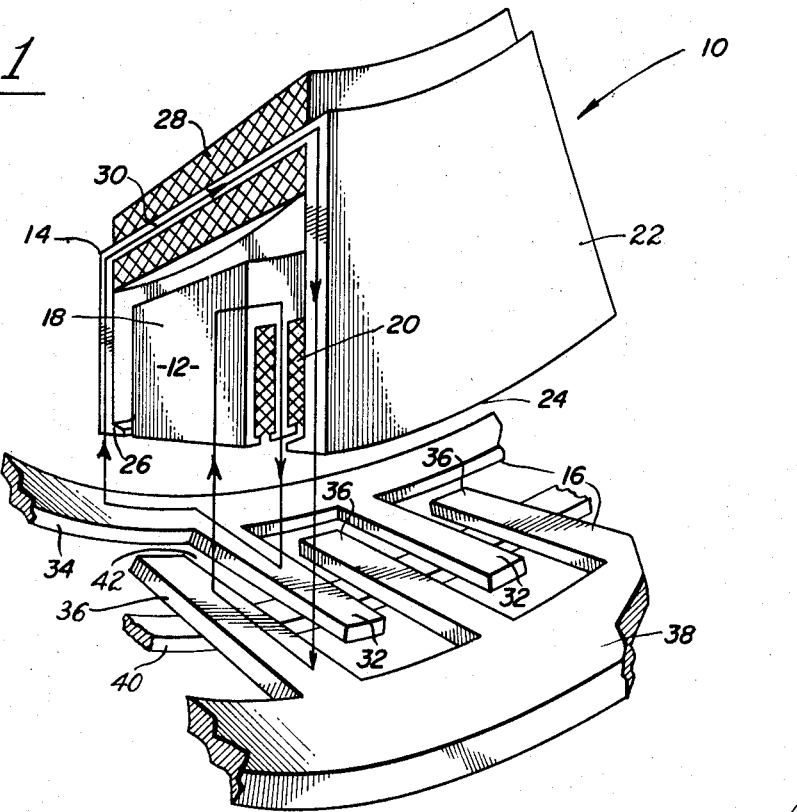
FIG. 1 shows an isolated perspective view of a portion of a motor incorporating the inventive principles in this case.

Referring generally to the drawings described above and particularly to FIG. 1, it may be seen that the invention in this case contemplates a rotational synchronous motor generally designated by reference numeral 10 having stator means 12 cooperatively related with field pole means 14, both being in spaced relationship from substantially cylindrical rotor means 16. Stator means 12 includes a laminated core 18 and stator conductor windings 20 and adapted to produce a flux field passing through the center of core 18. Stator means 12 is located in spaced relationship to field pole means 14 so as not to be magnetically coupled to the field pole means. Both items 12 and 14 are segmented units, not totally surrounding rotor 16. Field pole means 14 has a frame 22 with suitably formed poles 24 and 26 and an exitation coil 28 positioned around the center portion 30 of the frame. It will be understood that frame 22 and pole elements 24, 26 may assume other shapes differing from those illustrated. Moreover, field exitation coil 28 may be replaced in some cases with one or more permanent magnets to provide a field flux in a manner described hereinbelow. The foregoing elements and their operation are more fully disclosed in application Ser. No. 581,946 filed Sept. 26, 1966 with common inventorship, now U.S. Pat. No. 3,456,136.

As seen from FIG. 1, field pole elements 24 and 26 are of substantially identical shape and contour. Stator means 12 and field pole elements 24 and 26 are spaced from rotor means 16 which is of cylindrical form having a curvature generally corresponding with the curvature of field poles 24 and 26. Rotor 16 may be seen to include a plurality of elongate substantially parallel and spaced apart projections 32 extending from a common support 34, and a corresponding plurality of projections 36 extending from a second common support 38, the stated projections from elements 34 and 38 being interdigitated as shown, for example, in FIG. 1. It will be understood by those skilled in the art that items 32 and 34 constitute a first magnetic member, while items 36 and 38 together constitute a second magnetic member. Both foregoing members are supported in fixed relationship such as by rigid ring 40 permanently joined thereto as seen from FIG. 1, whereby items 32, 34, 36, 38, and 40 effectively comprise a single unitary structural mass rotatable about a center of rotation as described below. An airgap 42 between each of the juxtaposed salient magnet projections 32 and 36 is of sufficient length to substantially eliminate magnetic flux leakage between the stated projections during operation of motor 10. Ring 40 is suitably nonmagnetic such as a nickel base alloy, plastic, ceramic, or the like.

Referring to FIG. 1, it will be understood that a magnetic field is created by energization of field excitation coil 28 from a suitable source of direct current. The flux field thus created by coil 28 within center portion 30 of frame 22 will have a shape corresponding generally with the shape of frame 22, and thus will be downwardly directed by pole portion 24 into rotor 16 at a localized area of support 38 or else one of the projections 36. In either case, the flux path passes through at least a portion of the salient magnetic projections 36 and into the stator core 18 due to magnetic force resulting from energization of field coil 28. It will be understood that stator core 18 provides a flux path for a secondary magnetic field created by the stator windings 20 whereby the mentioned flux field is downwardly directed into one of the salient magnetic projections 32. Projection 36 will be understood to have a magnetic polarity opposite from that of projection 32. The flux path then continues through at least a portion of projection 32 and reaches support element 34 and travels therethrough, thence reaching field pole portion 26 and continuing to center portion 30 of frame 22, thus completing the field excitation circuit.

Figure 5:
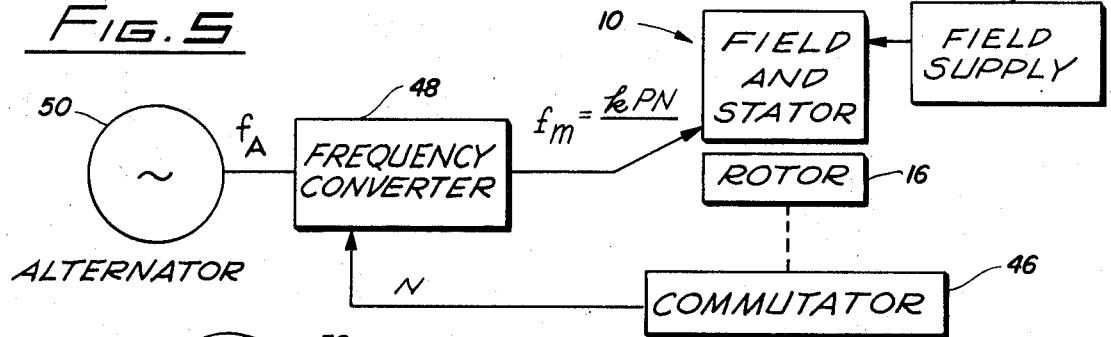
FIG. 5 shows an illustrative arrangement of circuitry for the motor shown in FIGS. 1 through 4.
Figure 6:
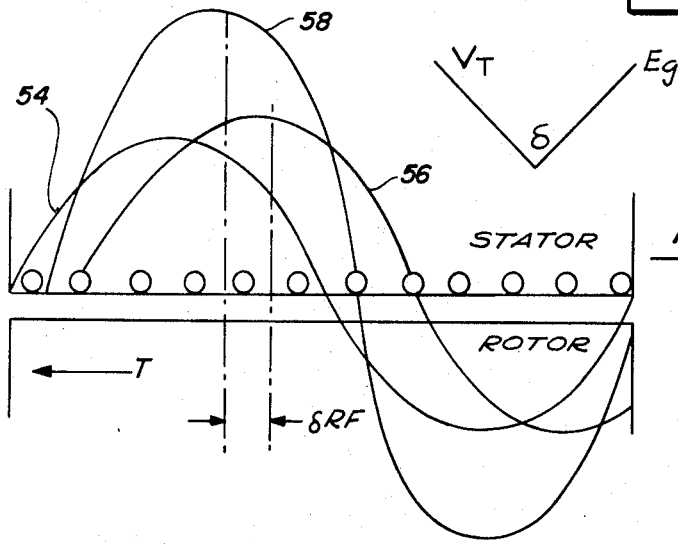
FIG. 6 is a graphic representation of the flux field intensities associated with operation of the motor shown in FIGS. 1 through 4.

Referring more particularly to FIG. 5, operation of motor 10 may be seen to advantageously include a commutator 46 preferably of electromagnetic type, which functions to sense the tangential velocity of rotor 16 relative to stationary stator and field means 12 and 14, respectively, and acts as a position transducer. Commutator 46 provides a speed and position signal of rotor 16 to a frequency converter 48 which is supplied either polyphase electrical power from a conventional source of alternating current such as alternator 50, or a source of direct current power (not shown). When using alternating current, current is supplied to frequency converter 48 at a particular predetermined frequency $f_A$. Frequency converter 48 receives the velocity and position signal from commutator 46 and automatically maintains an applied stator frequency $f_n$, according to the relationship $f_n$ equals $kPN$, where $k$ is a constant of proportionality, P equals the number of pole elements in rotor 16, and N is the tangential velocity of rotor 16. When direct current is supplied, converter 48 converts the same to alternating current at the applied stator frequency $f_n$. Frequency converter 48 applies the variable frequency input $f_n$ to stator means 12 of motor 10 so that the stator means creates a traveling magnetic wave which substantially matches the linear velocity of the flux field generated by field means 14. The foregoing conditions result in a stator magnetic wave and a field magnetic wave which are stationary with respect to each other and are separated by a displacement angle or phase angle delta ($\delta$). Propulsive force results from operation of motor 10 because of the two stated fields attempting to align. The stator magnetic wave normally leads the field magnetic wave, resulting in the mentioned force or thrust between stator means 12 and rotor 16 of motor 10. The operative relationship between commutator 46 and frequency converter 48 is also adaptable to operate motor 10 at a predetermined power factor of unity, leading or lagging in any particular case.

The foregoing relationship between the traveling stator magnetic wave and the fixed flux field produced by field means 14 may be seen more particularly by reference to FIG. 8. The traveling flux field of stator means 12 is indicated by curve 54 and the fixed flux field indicated by curve 56 produce a resultant wave 58. The propulsive thrust or force T is determined according to the relationship:

T equals $k\theta_r F \sin \text{delta}_{rf}$

Wherein T equals thrust, $\theta_r$ designates the amplitude of the resultant wave 58, F equals the magnetomotive force of field wave 56, and $\delta_{rf}$ is the displacement angle between the resultant flux $\theta_r$ and the field magnetomotive force $f$ which is essentially constant and slightly less than 90 electrical degrees. The foregoing relationship results when stator wave 54 and field wave 56 are maintained substantially stationary relative to each other.

The magnetomotive force and the resultant flux $\theta_r$ are directly related to field voltage $E_a$ and stator terminal voltage $V_t$. Thus, the displacement angle $\delta_{rf}$ is maintained substantially constant at any speed or frequency. This condition holds true at the zero or starting condition of motor 10 as well as at any relative movement between rotor 16 and stator means 12. In the starting condition, the frequency is reduced to zero. At zero speed commutator 46 senses the speed and position of rotor 16 while a polyphase current input to frequency converter 48 occurs. The stator current distribution and magnetic wave 54 along the airgap of the stator is approximately sinusoidal and displaced in space from the field magnetic wave 56 by approximately 90 electrical degrees (or other selected angle). At zero speed, stator wave 54 and field wave 56 are again stationary with respect to each other and separated by a finite displacement. The conditions for positive propulsive force are, therefore, achieved whereby thrust results. The same principles and operating theory for producing the mentioned propulsive force discussed above are also explained in issued U.S. Pat. Nos. 3,456,136 issued Jul. 15, 1969 and 3,448,363 issued Jun. 3, 1969.

A reversal of magnetomotive force applied to rotor 16 such as to produce reversal of movement direction results by simple reversal of field excitation current applied to field windings 28. The separate source for energizing field windings 28 is suggested in FIG. 5 by reference numeral 52.

Motor 10 shown in FIG. 1 and discussed above is further adaptable for use with vehicle wheels and the like as suggested by FIGS. 2 and 3, wherein rotor 16 is secured within a rim element 94 upon which a vehicle tire 96 is mounted in the conventional manner. Support for wheel 98 thus formed in the manner shown by FIG. 2 is provided in the manner shown by FIG. 3 wherein reference numeral 100 denotes rigid nonrotatable vehicle structure including a mounting shaft 102 for wheel 98. Wheel 98 includes hub structure 104 rotatably journaled on shaft 102 by suitable means such as roller bearings 106 and secured thereto by holding means in the form of wheel nut 108. Hub 104 has a radially extending portion 110 to which rotor 16 is rigidly connected whereby rotation of wheel 98 about a center of rotation through shaft 102 involves rotation of tire 96, rim 94, rotor 16, and hub 104. Propulsive force to cause rotation of rotor 16 results from electrical energization of segmented modular stator means 12 and field means 14 mounted on structure 100 and stationary relative thereto. Wheel 98 can be used in many different types of vehicle, for example, such as substituted for wheel W in the vehicle shown by FIG. 5 of U.S. Pat. No. 2,421,351, issued May 29, 1947.

Referring to FIG. 4, application of the inventive principles disclosed herein and particularly as discussed in connection with motor 10 shown in FIG. 1 may be seen in conjunction with a flywheel or energy storing mass 120. Flywheel 120 may be relatively heavy throughout its periphery such as by securing a substantial mass of material to substantially cylindrical rotor 16 or by making the rotor of relatively heavy magnetically responsive metal or alloy to provide a high moment of inertia for the rotatable mass. Flywheel 120 is connected by struts 126 to shaft 122 which is suitably supported by bearings 124 at each end thereof as suggested in FIG. 4. Suitable means (not shown) of conventional prior art design may be provided for extracting energy from flywheel 120 by operative connection with shaft 122.

All of the embodiments shown herein are characterized by uniformly high starting torque and sustained motive power. In all of the embodiments, additional segmented or modular units of stator and field winding means 12 and 14 may be conveniently employed instead of merely one or two as shown in the drawings. Illustratively, each segment may comprise about 10 to 20° of the total 360° circle defined by rotor 16 in any case, and a single such segment is sufficient for power applications of moderate demand.

I claim:

1. Gearless drive means comprising:

a linear synchronous motor having a generally cylindrical interdigitated rotor;

bearing support means for supporting said rotor rotationally about an axis;

said motor also having field pole means operatively associated with said stator means;

mounting means for supporting said stator means and said field pole means stationary relatively to said rotor; and propulsion means secured to said rotor and rotatable therewith for propelling said motor along a path of travel.

2. The structure set forth in claim 1 above, wherein said propulsion means consist of rim means secured to said rotor and a tire mounted on said rim and adapted to make rolling contact with a road surface.

3. Wheel-mounted drive means for a vehicle, essentially comprising:

a hollow wheel hub journaled on a center shaft for rotation about an axis;

rim means secured to said hub;

tire means supported on said rim means;

interdigitated substantially cylindrical rotor means connected to said rim means and including a plurality of substantially parallel and spaced apart elongate projections;

support means within said hollow hub and secured to said vehicle;

segmented stator means mounted on said support means and operatively related to said rotor means to produce a traveling magnetic wave in said rotor means; and segmented field pole means mounted on said support means and operatively related to said rotor means to produce a fixed magnetic wave in said rotor means, said traveling and fixed magnetic waves producing electromotive force to cause rotation of said rotor means, wheel hub, rim means, and tire means about said rotation axis.

PO-1050
(5/69)

UNITED STATES PATENT OFFICE
CERTIFICATE OF CORRECTION

Patent No. 3,548,965     Dated December 22, 1970

Inventor(s) John J. Pierro

It is certified that error appears in the above-identified patent and that said Letters Patent are hereby corrected as shown below:

Column 4, line 25, after "about an axis;" insert -- said motor further having stator means; --

Signed and sealed this 7th day of September 1971.

(SEAL)
Attest:

EDWARD M. FLETCHER, JR.
Attesting Officer

ROBERT GOTTSCHALK
Acting Commissioner of Pate